United States Patent [19]
Walker

[11] Patent Number: 5,246,120
[45] Date of Patent: Sep. 21, 1993

[54] BICYCLE RACK

[76] Inventor: Joseph H. Walker, 102 Hedgewood Ct., Peachtree City, Ga. 30269

[21] Appl. No.: 777,131

[22] Filed: Oct. 16, 1991

[51] Int. Cl.⁵ .............................................. A47F 7/00
[52] U.S. Cl. ........................................ 211/19; 211/21
[58] Field of Search ................ 211/19, 21, 23, 104, 211/5, 17, 18, 20; 248/315

[56] References Cited

U.S. PATENT DOCUMENTS

| | | | |
|---|---|---|---|
| 581,585 | 4/1897 | Hirschman | 211/21 |
| 590,773 | 9/1987 | Pruden | 211/104 X |
| 615,264 | 12/1898 | DuPont | 211/19 |
| 619,344 | 2/1899 | Pyott, Jr. | 211/18 |
| 625,657 | 4/1899 | Elliott . | |
| 648,234 | 4/1900 | Brown | 211/19 |
| 661,677 | 3/1900 | Taylor | 211/22 |
| 679,794 | 8/1901 | Sweet | 211/19 |
| 2,672,241 | 3/1954 | Cohen et al. | 211/104 X |
| 2,706,049 | 4/1955 | Andrews | 211/104 X |
| 3,355,028 | 11/1967 | Mork | 211/21 |
| 4,063,647 | 12/1977 | Blackmore | 211/19 |
| 4,352,432 | 10/1982 | Smith | 211/19 |
| 4,465,196 | 8/1984 | Erb | 211/19 |
| 4,830,196 | 5/1989 | Csanady | 211/19052469384 |

*Primary Examiner*—David A. Scherbel
*Assistant Examiner*—Derek J. Berger
*Attorney, Agent, or Firm*—Nixon & Vanderhye

[57] ABSTRACT

A substantially L-shaped bicycle rack includes a substantially vertical first member adapted to be fastened to a vertical supporting surface such as a wall, and a substantially horizontal second member extending away from the wall and pivotally mounted to the first member for movement between a first substantially vertical inoperative position, and a second substantially horizontal operative position. The first member is formed with an elongated groove for receiving one portion of a bicycle wheel and the second member is formed with an elongated slot for receiving another portion of the same wheel. The rack is located at a height on the wall so that the bicycle may be tilted back on its rear wheel and rolled into place on the rack, with the front wheel supported in the groove and slot.

10 Claims, 5 Drawing Sheets

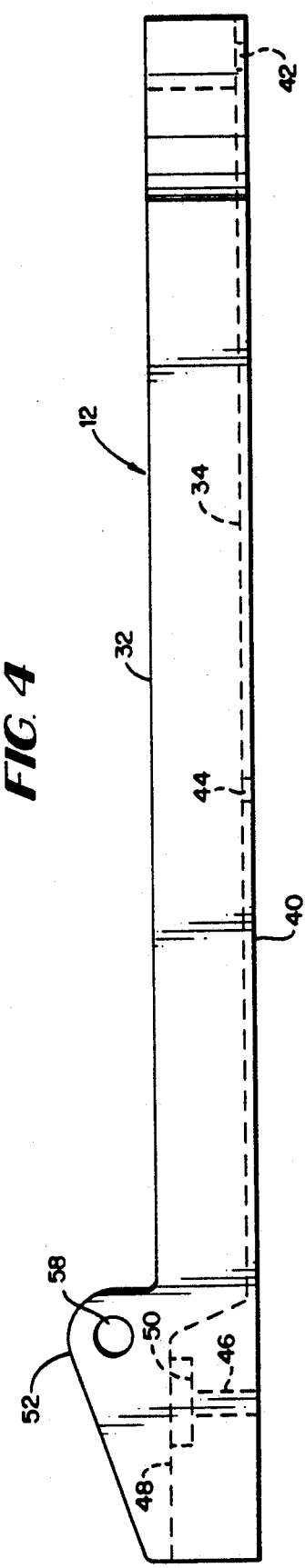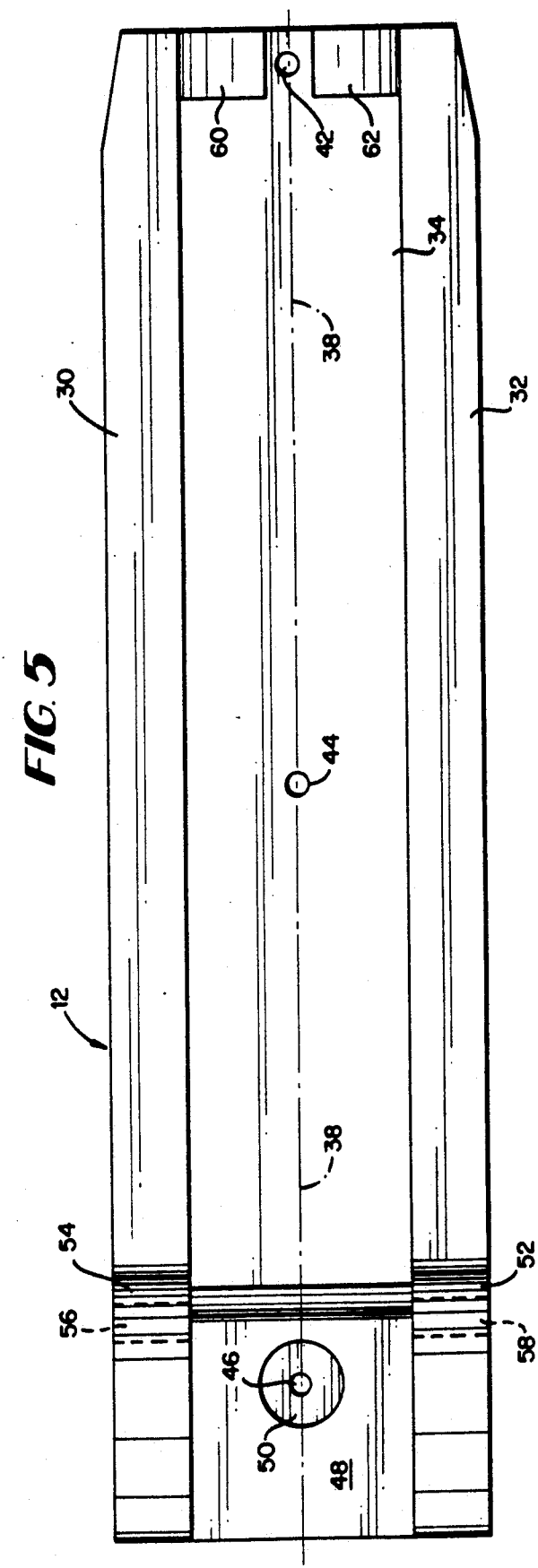

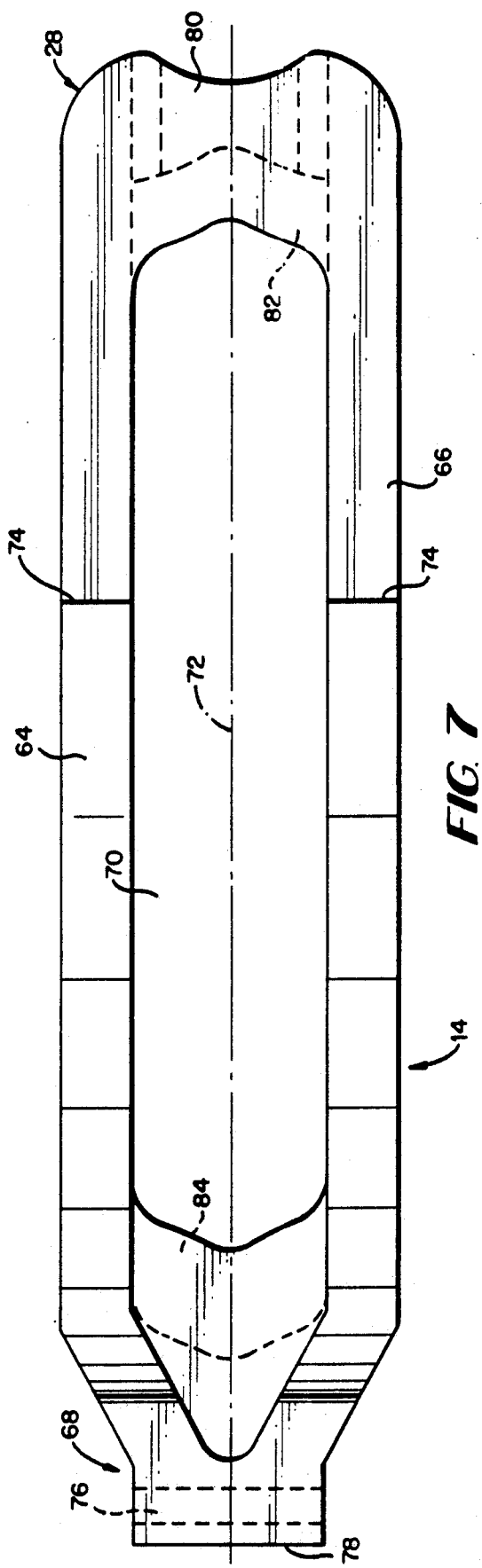
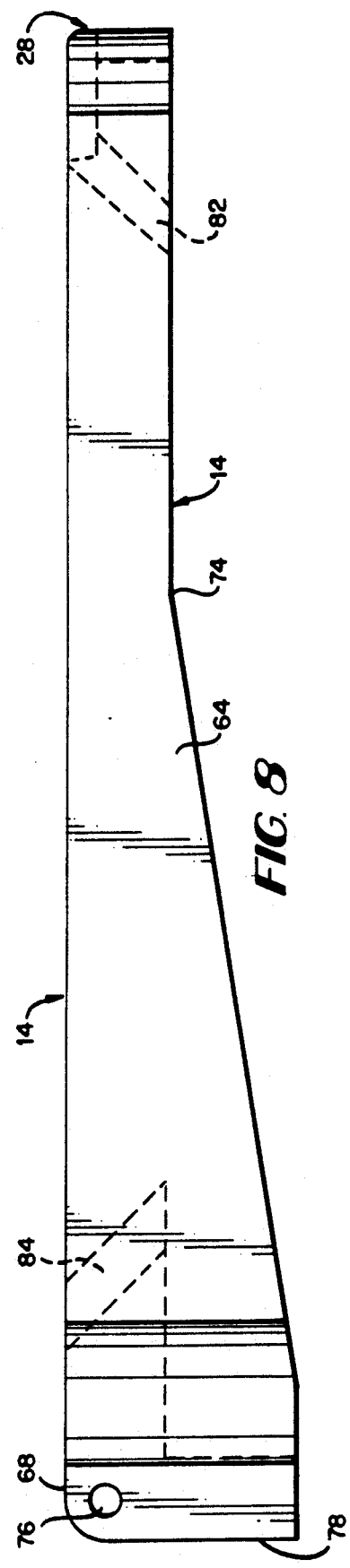

BICYCLE RACK

This invention relates generally to bicycle racks and, more specifically, to a wall mounted bicycle rack which is designed to support a two wheeled bicycle in a vertical position, but with the rear wheel of the bicycle supported on the ground so that the bicycle need not be lifted in order to engage it within the rack.

BACKGROUND AND SUMMARY OF THE INVENTION

Bicycle racks are, of course, well known and numerous constructions are utilized to support two wheeled bicycles horizontally as well as vertically. For purposes of this application, supporting the bicycle "vertically" means that one wheel (of a two wheeled bicycle) is above the other, and supporting the bicycle "horizontally" means that one wheel is in front of the other, i.e., in a normal riding orientation. In order to support a bicycle vertically, ceiling-mounted hooks or the like are typically utilized to suspend the bicycle by engaging the front wheel thereof. Such devices are both awkward and difficult to use, insofar as the bicycle must be lifted a substantial distance off the ground while holding the front wheel steady to engage the front wheel (between its spokes) over the hook-like portion of the support.

Other rack devices include a pair of wall mounted racks or brackets for supporting a bicycle above the ground but in a generally horizontal orientation. Here again, the bicycle must be lifted off the ground in order to engage the brackets.

Ground supported racks are more easily engaged but provide no space-saving feature, i.e., the bicycles are merely supported in their normal, horizontal orientation.

The present invention seeks to alleviate the aforementioned problems associated with conventional bicycle racks by providing a simple, low cost, lightweight and easy-to-use device which permits vertical storing of a bicycle without having to lift the bicycle off the ground in order to engage the rack.

Accordingly, in an exemplary embodiment of the invention, a substantially L-shaped rack is employed which includes a substantially vertical first member adapted to be fastened to a vertical supporting surface, such as a wall, and a substantially horizontal member extending away from the wall and pivotally mounted to the first member for movement between a first substantially vertical inoperative position, and a second substantially horizontal operative position. The first (inoperative) position is one in which the horizontal member is pivoted upwardly to engage the wall mounted member so as to conserve space by reducing the profile of the rack when not in use. By simply pivoting the second member to its horizontal or operative position, the rack is ready for use in supporting a bicycle in a vertical orientation.

In the exemplary embodiment, the first or wall mounted member is provided with an elongated groove for receiving one portion of the front wheel of the bicycle, while the horizontal member is provided with an elongated slot for receiving another portion of the same wheel, thereby precluding any substantial turning movement (i.e., steering movement as opposed to rotation) of the wheel.

By locating the rack at an appropriate height on the vertical supporting wall or other surface, (based on the bicycle size), the user need only tilt the bicycle to the vertical orientation and roll it forwardly on its rear wheel until the front wheel is engaged within the groove on the wall mounted member and within the slot on the horizontally extending member. To facilitate such engagement with the rack, the forward portion of the horizontal member, i.e., that portion remote from the wall mounted member, is provided with a rounded and grooved guiding surface which permits the front wheel of the bicycle to roll over the edge of the member and into the slot.

Thus, in its broader aspects, the bicycle rack of this invention comprises a substantially L-shaped frame including a first substantially vertical member adapted for mounting to the substantially vertical supporting surface, and a second substantially horizontal member extending away from the first member, the first and second members having aligned first and second respective bicycle wheel receiving surface configurations formed therein.

In another aspect, the second or horizontal member may be pivotally mounted to said first member for movement between operative an inoperative positions, and the second member may be releasably secured to the first or vertical member in the inoperative position.

The present invention is of lightweight construction, easily installed, easily used, inexpensive to manufacture, and requires little space when not in use. In addition, the bicycle need not be lifted off the ground to be fully engaged in the rack in a vertical orientation. Thus, the rack according to this invention provides several advantages over prior, known bicycle racks.

Other objects and advantages of the present invention will become apparent from the detailed description which follows.

BRIEF DESCRIPTION OF THE DRAWINGS

FIG. 4 is a side view of the wall mounted portion of the bicycle rack illustrated in FIG. 1;

FIG. 5 is a top plan view of the member illustrated in FIG. 4;

FIG. 7 is a bottom plan view of the horizontal wheel supporting member of the bicycle rack illustrated in FIG. 1;

FIG. 8 is a side view of the member illustrated in FIG. 7; and

DETAILED DESCRIPTION OF THE DRAWINGS

Figure 2:
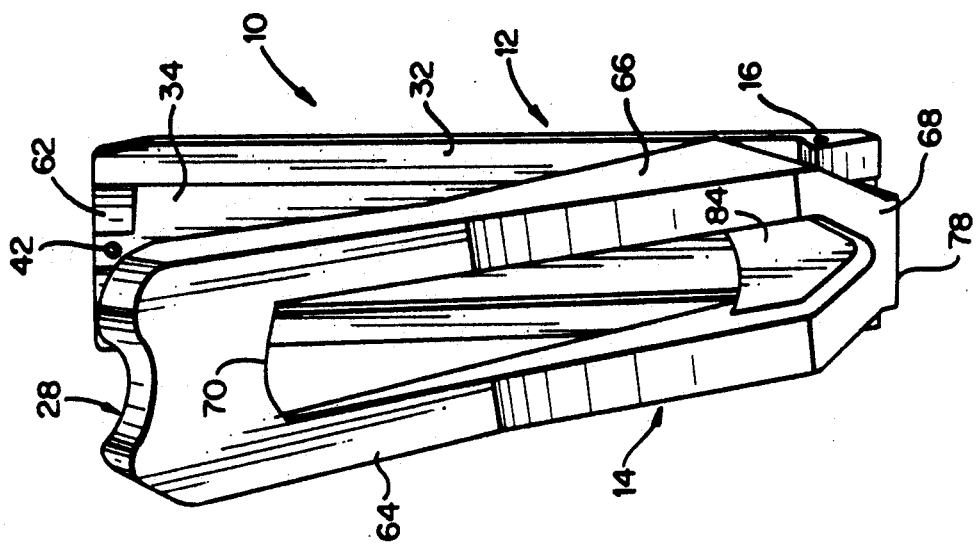
FIG. 2 is a perspective view of the bicycle rack illustrated in FIG. 1 with the horizontal member pivoted upwardly toward an inoperative or non-use position.
Figure 1:
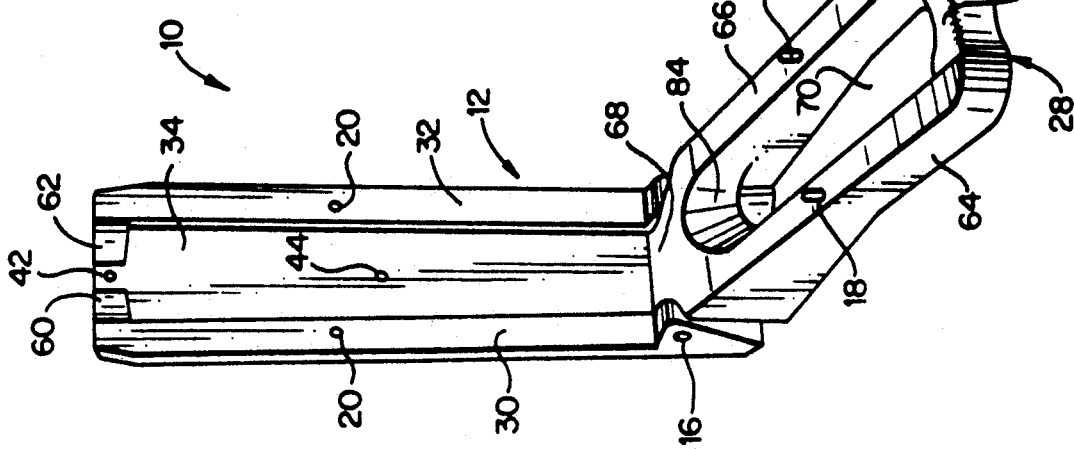
FIG. 1 is a perspective view of a bicycle rack in accordance with an exemplary embodiment of the invention.
Figure 3:
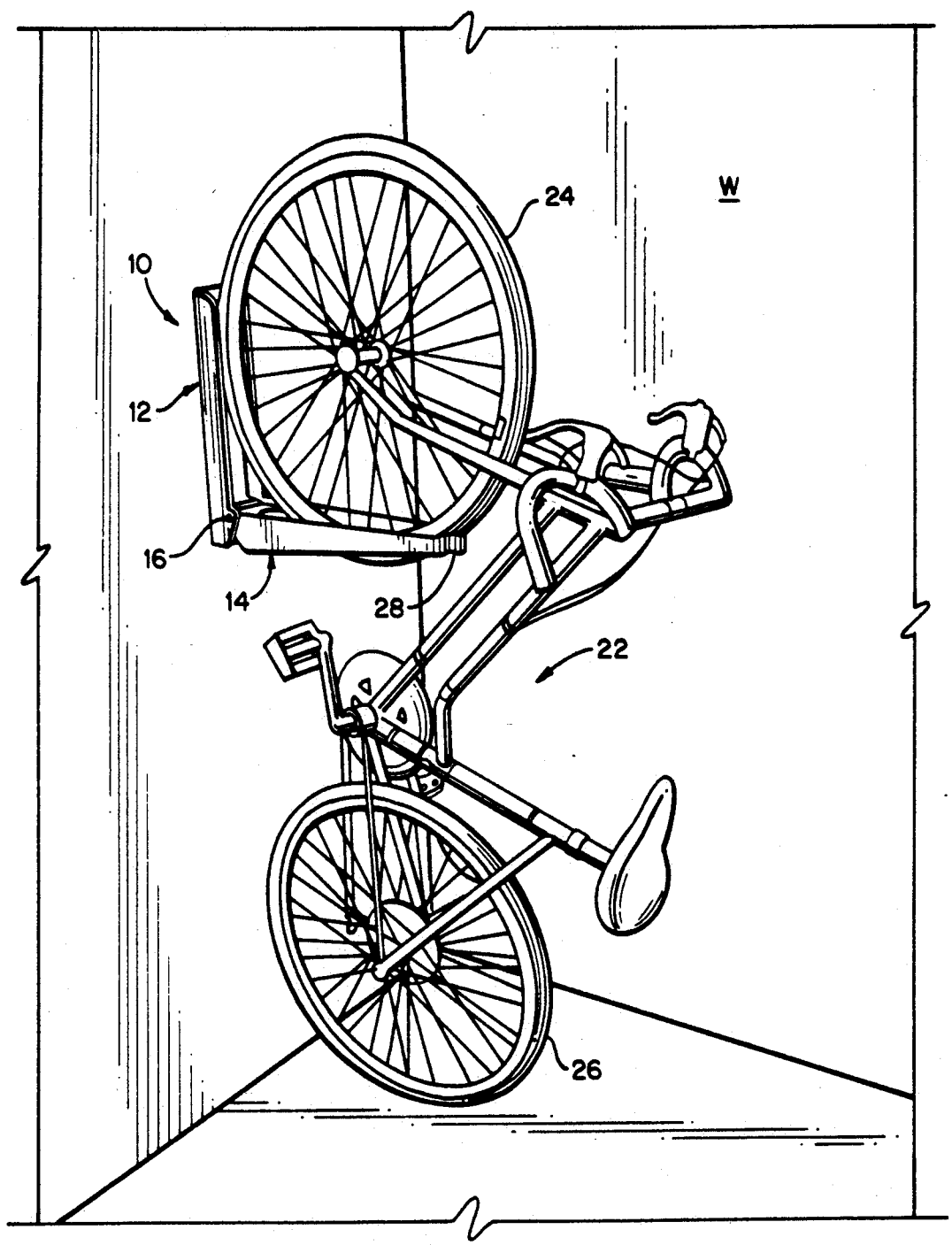
FIG. 3 is a perspective view of the bicycle rack illustrated in FIG. 1 with a bicycle supported thereon.

With reference generally to FIGS. 1-3, the rack 10 in accordance with an exemplary embodiment of the invention generally includes a first member 12 which is adapted to be mounted on a vertical supporting surface such as a wall W or the like, and a second member 14 which is pivotally mounted to the first member 12 by means of a pivot pin 16. Member 14 is thus able to be moved between an inoperative storage position (FIG. 2) and an operative bicycle supporting position (FIGS. 1 and 3). To place member 14 in the inoperative position, the latter is rotated upwardly to a position substantially parallel to the wall mounted member 12. In this position, the member 14 may be releasably secured to member 12 by any suitable means, such as for example, a pair of projecting pins 18 on member 14 which may be frictionally engaged (or snapped into) a pair of corresponding recesses 20 on member 12. This feature is shown only in FIG. 1, for exemplary purposes only, and it will be understood that other releasable locking arrangements may be employed. In order to make the rack ready for use, the second member 14 is pivoted downwardly to a substantially horizontal position as best seen in FIGS. 1 and 2.

In the preferred arrangement, the rack 10 is mounted on a wall surface W (or other vertical surface) at a predetermined height which will permit a bicycle 22 to be rolled forward with its front wheel 24 raised and its rear wheel 26 on the ground, until the front wheel 20 rolls over the forward end 28 of the second member 14 as described in further detail below. Thus, a significant feature of this invention is that the bicycle need not be lifted off the ground in order to secure it within the rack 10 in a vertical orientation (see FIG. 3).

With reference now to FIGS. 4 through 9, the design details of the individual members 12 and 14 will be described, with references to "upper", "lower", "vertical", "horizontal", etc. considered with the rack mounted on a vertical supporting surface as shown in FIG. 3. Accordingly, the first member 12 which is to be fastened to the vertical supporting surface W includes a pair of outwardly projecting, substantially parallel side walls 30, 32 interconnected by a shallow, solid portion web 34, thereby defining a vertical groove 36 extending along a center line 38.

The rear surface 40 of member 12 is flat, thereby providing flush engagement with the wall surface W. Vertically aligned holes 42, 44 and 46 are provided within the web 34 to facilitate fixing the member 12 to the wall surface W by means of any suitable fasteners such as screws, molly bolts or the like. In this regard, the lowermost hole 46 is located in a thickened web portion 48, countersunk at 50. In this same location, the side walls 30, 32 merge into ears 52, 54 which project outwardly beyond the side walls 30, 32 each ear provided with a horizontally extending bore 56, 58, respectively, for receiving the pivot pin 16.

Figure 6:
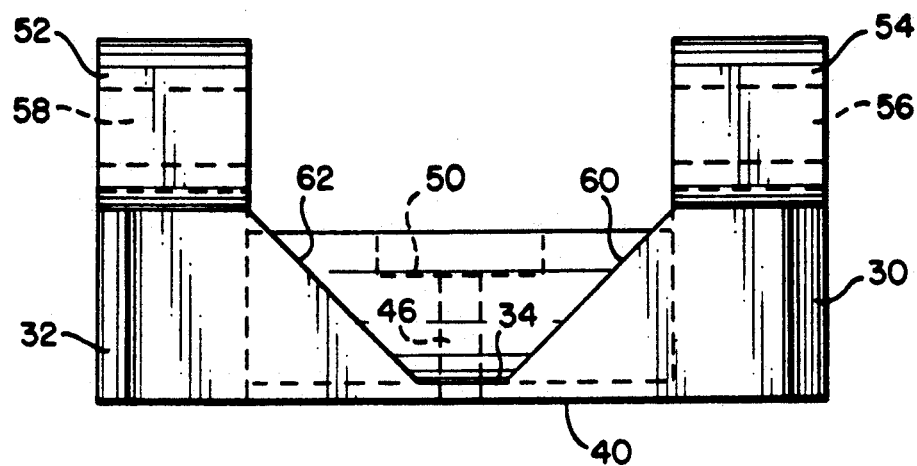
FIG. 6 is a front end view of the member illustrated in FIG. 4.

The upper end of member 12 is formed with a pair of inwardly directed inclined surfaces 60, 62 which terminate on either side of the uppermost hole 42, best seen in FIGS. 5 and 6. These surfaces provide an additional holding function vis-a-vis the front wheel 24 of the bicycle 22.

Figure 9:
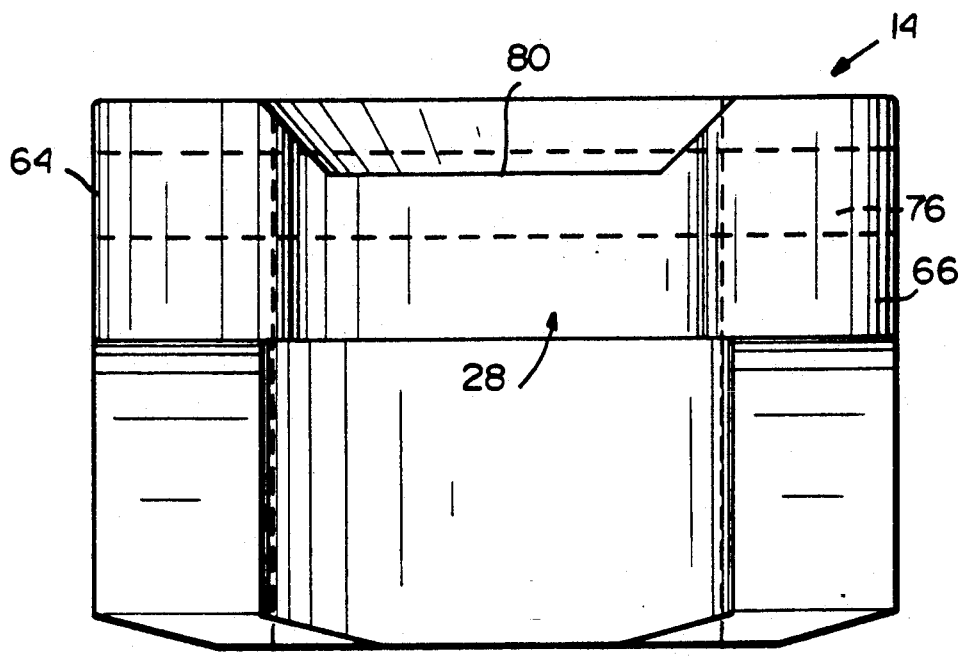
FIG. 9 is a front end view of the member illustrated in FIG. 7.

Referring now to FIGS. 7-9, the second member 14 also includes a pair of parallel side walls 64, 66, the front end 28 and a narrow rearward end 68. The side walls 64, 66 along with ends 28, 68 define an elongated closed periphery through slot or aperture 70 extending along a center line 72 which lies in substantially the same vertical plane as the center line 34 of the first member 12.

The side walls 64, 66 of member 14 increase in depth (or thickness) from a point 74 (beyond the midpoint of the member 14) to the rearward end 68 as best seen in FIG. 8, thereby increasing the depth of the slot 70 from the outer to the inner end thereof.

As best seen in FIG. 7, the narrowed rearward end 68 of member 14 has a width which allows it to fit between the projecting ears 48, 50 of member 12. The narrowed end portion 68 is provided with a transverse bore 76 (extending substantially perpendicular to the centerline 74) which will align with the apertures 50, 52 in member 12 when members 12 and 14 are assembled, so that pivot pin 16 will extend through the apertures 50 and 52 and bore 78 to thereby pivotally mount the member 14 to member 12.

The rearwardmost surface 78 of member 14 is substantially flat so that when member 14 is pivoted to its substantially horizontal operative position, surface 78 will be in flush engagement with a similarly flat surface 82 on the thickened web 44 of member 12. Thus, web 44 provides a stop limit to the downward movement of member 14 relative to member 12, when the former reaches its horizontal, operative position. It will further be noted that the countersunk portion 46 permits such flush engagement, i.e., the fastener extending through mounting hole 42 does not project above surface 44.

The outer or forward end portion of member 14 has a grooved and rounded configuration, i.e., a generally hourglass shaped surface 80 which enables the front wheel 24 of the bicycle 22 to roll over the forward portion 28 and into the slot 72. Just behind surface 80, an inclined surface 82 extends from the generally hourglass shaped portion downwardly into the slot 70. This surface further facilitates the rolling action of the front wheel 24 as it enters the slot. It will be further appreciated that surfaces 80, 82 also facilitate removal of the bicycle 22 from the rack by a reverse procedure, where the bicycle is simply pulled away from the rack so that the wheel 24 will roll up the inclined surface 82 and over the hourglass shaped surface 80. The rearward end of slot 70 is also provided with an inclined surface 84 which extends to the narrowed rearward end 70, thereby providing support for a portion of wheel 24 which extends upwardly out of the slot 72 and towards the upper member 12.

With the bicycle 22 fully engaged in the rack as shown in FIG. 3, it will be seen that one portion of the wheel 24 is received within the slot 72 and supported by the surrounding surfaces of member 14. At the same time, another portion of the front wheel 24 is received within the groove 36 of member 12. This arrangement precludes any side-to-side steering movement of the front wheel 24 relative to the bicycle 22, thereby achieving a stable support position for the bicycle 22 which, at the same time, has rear wheel 26 supported on the ground and also engaged by wall W.

It will be appreciated that the above described wall mounted bicycle rack may be constructed of any suitable material, with a relatively rigid plastic material presently preferred. Other materials such as wood, aluminum, etc. may also be employed.

It will be further appreciated that the rack may be made of a single L-shaped component or two components as described, with or without the pivoting movement feature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bicycle rack for supporting a bicycle in a substantially vertical orientation such that one wheel only of the bicycle is supported by the rack substantially vertically aligned above another wheel of the bicycle, the rack consisting of first and second plastic members, the first member including means for mounting the rack to a substantially vertical supporting surface, and the second member pivotally secured to one end of said first member such that, in an operative position, said second member extends substantially perpendicularly away from said first member, said first and second plastic members having aligned first and second respective bicycle wheel receiving means formed thereof or receiving, respectively, circumferentially spaced portions of only the one bicycle wheel, said first bicycle wheel receiving means comprising an elongated substantially vertically oriented groove; and said second bicycle wheel receiving means comprising an elongated substantially horizontally oriented through-aperture defined by integral rear end, front end and side walls of said second member, and wherein said front end wall is formed with a generally hourglass shape for guiding the one wheel of the bicycle into said through aperture.

2. The bicycle rack of claim 1 wherein said second member is pivotally movable from said operative position to an inoperative position where said second member is substantially parallel to said first member.

3. A rack system for substantially vertically supporting a bicycle comprising, in combination, a substantially vertical support surface; and a substantially L-shaped body having a first plastic member provided with means for engaging a first portion of one bicycle wheel; a second plastic member pivotally secured to said first member and extending, in a first operative position, substantially horizontally from said first member, said second member having a substantially horizontally extending closed periphery through-aperture for receiving another portion of said bicycle wheel, said through aperture defined by integral front end, rear end, and side walls of said second member, said front end having a generally hourglass shaped guiding surface for guiding said one bicycle wheel into said closed periphery through-aperture, and further wherein said L-shaped body is mounted on said support surface at a predetermined height chosen according to bicycle size, such that when one wheel of the cycle is located within said through-aperture, another wheel of the bicycle is supported on the ground.

4. The rack system according to claim 3 wherein wherein said engaging means comprises an elongated groove.

5. The rack system of claim 3 wherein said first member is provided with a pair of laterally spaced ears having aligned pivot pin holes and said second member is provided with an end portion receivable between said ears, said end portion having a bore aligned with said pivot pin holes, and a pivot pin extending between said pivot pin holes, through said bore.

6. The rack system of claim 3 wherein said first member is provided with a plurality of fastener apertures, and a corresponding number of fasteners extending through said apertures into said support surface.

7. The rack system according to claim 3 wherein said first member includes a stop surface for limiting the pivoting movement of said second member.

8. The rack system according to claim 2 and wherein said second member is pivotable to a second inoperative position where said second member is substantially parallel to said first member, and further including releasable means for holding said second member in said second inoperative position.

9. A bicycle rack for supporting a bicycle in a substantially vertical orientation and substantially perpendicular to an adjacent substantially vertical support surface, such that one wheel of the bicycle is substantially vertically aligned above another wheel of the bicycle, the rack consisting of first and second members, the first member adapted for mounting to the substantially vertical supporting surface, and the second member pivotally secured to one end of said first member such that, in an operative position, said second member extends substantially perpendicularly away from said first member, said first and second members having aligned first and second respective bicycle wheel supporting surfaces formed therein for receiving, respectively, circumferentially spaced portions of only the one bicycle wheel, said second bicycle wheel supporting surface comprises an elongated substantially horizontally oriented aperture; wherein said aperture is partially defined by sidewalls of said second member which increase in thickness in a direction toward said one end of said first member.

10. A rack for substantially vertically supporting a bicycle comprising, in combination, a substantially vertical support surface; and a substantially L-shaped body having a first member provided with means for engaging a first portion of one bicycle wheel; a second member extending substantially horizontally from said first member and having a substantially horizontally extending closed periphery through slot for receiving another portion of said bicycle wheel, said through slot defined by a front end, rear end, and side walls of said second member, said front end having a grooved guiding surface for guiding said one bicycle wheel into said slot, and further wherein bid L-shaped body is mounted on said support surface at a predetermined height chosen according to bicycle size, such that when one wheel of the bicycle is supported said slot, another wheel of the bicycle is supported on the ground, and wherein said horizontally extending slot comprises an aperture defined in part by side walls of varying thickness.

* * * * *